H. BROOKE.
Casting Stench-Traps.
No. 154,638. Patented Sept. 1, 1874.
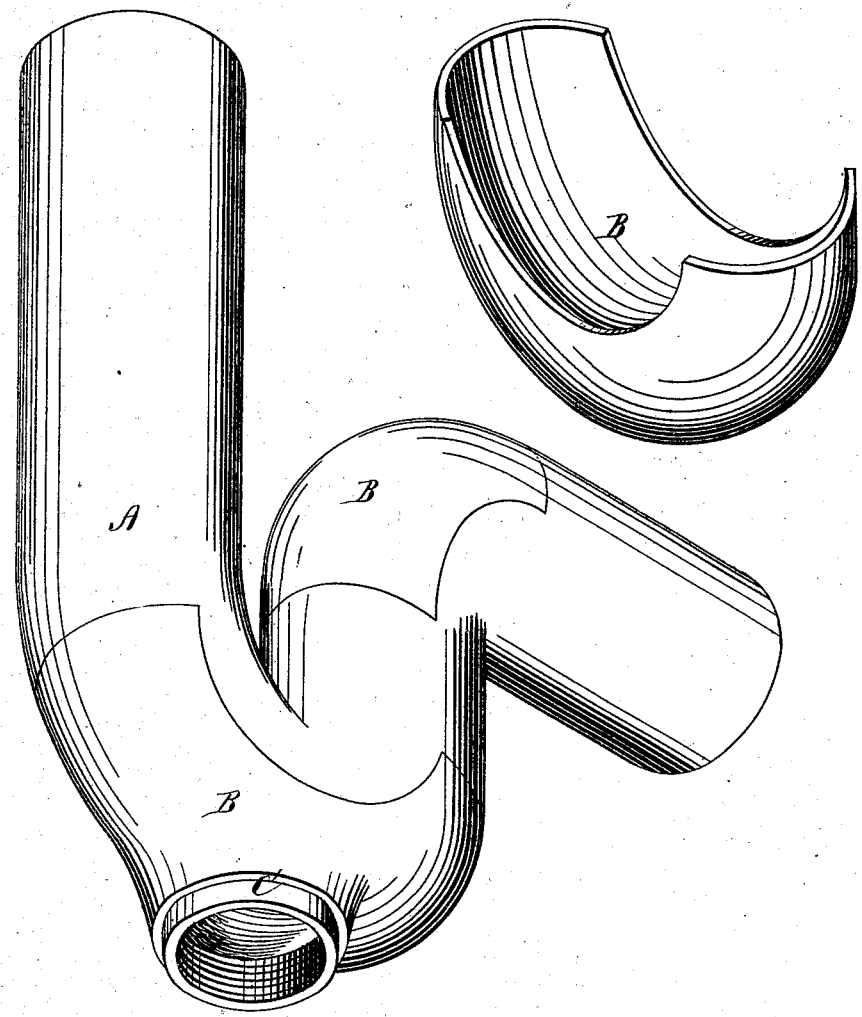
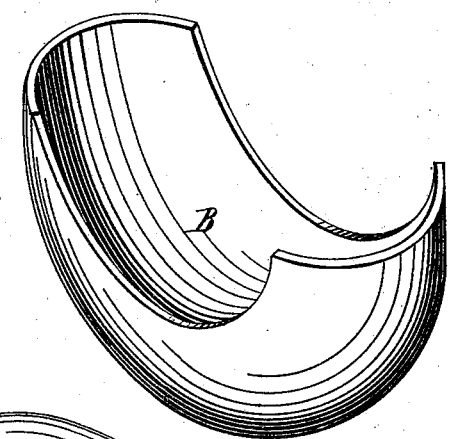

UNITED STATES PATENT OFFICE.

HOMER BROOKE, OF NEW YORK, N. Y.

IMPROVEMENT IN CASTING STENCH-TRAPS.

Specification forming part of Letters Patent No. 154,638, dated September 1, 1874; application filed June 9, 1874.

*To all whom it may concern:*

Be it known that I, HOMER BROOKE, of New York, in the county of New York and in the State of New York, have invented certain new and useful Improvements in Lead Stench-Traps; and do hereby declare that the following is a full, clear, and exact description thereof, reference being had to the accompanying drawings and to the letters of reference marked thereon, making a part of this specification.

My invention relates to lead stench-traps or other like articles of lead or white metal, but more particularly to the S and half-S traps for plumbers' use; and the nature of my invention consists in making the rounded part of the trap open, the better to facilitate the withdrawing of the cores in the making of it, the parts that are made open being afterward closed by suitable-shaped pieces, by soldering or otherwise, so as to produce a perfect trap, as will be hereinafter more fully set forth.

In order to enable others skilled in the art to which my invention appertains to make and use the same, I will now proceed to describe its construction and operation, referring to the annexed drawing, in which—

Figure 1 is a perspective view of a half-S stench-trap embodying my invention, and Fig. 2 is a similar view of one of the pieces used to close the open rounded part of the trap.

A represents an ordinary half-S stench-trap, such as are used by plumbers, and made of lead or white metal. This trap is made open at the rounded parts, for the purpose of facilitating the withdrawing of the cores in the making of it. These rounded open parts are afterward closed with suitable-shaped pieces B B, by soldering or otherwise fastening them, so as to make a water-tight joint and produce a perfect trap.

By this mode of making them I am also enabled to increase the size or diameter of the bore at the bends or elbows, by inlaying the piece B that covers the opening, or by making the openings larger themselves.

I am also enabled to make the inside of the trap rounding in the bends—that is, free from all sharp angles—and also to fasten a screw-ring, C, in the part B, as shown.

Having thus fully described my invention, what I claim as new, and desire to secure by Letters Patent, is—

A stench-trap, A, having openings in its elbows or bends, which openings are covered by curved caps B, as shown and described.

In testimony that I claim the foregoing I have hereunto set my hand this 27th day of May, 1874.

HOMER BROOKE.

Witnesses:
 THOS. CROCKER,
 H. W. REDFIELD.